(12) United States Patent
Qian et al.

(10) Patent No.: US 9,873,380 B2
(45) Date of Patent: Jan. 23, 2018

(54) INTERIOR SIDE MIRROR FOR SIDE BLIND SPOT OF A CAR

(71) Applicants: Davy Zide Qian, Arcacia, CA (US); Benyu Qian, Shanghai (CN); Lequn Lu, Shanghai (CN)

(72) Inventors: Davy Zide Qian, Arcacia, CA (US); Benyu Qian, Shanghai (CN); Lequn Lu, Shanghai (CN)

( * ) Notice: Subject to any disclaimer, the term of this patent is extended or adjusted under 35 U.S.C. 154(b) by 115 days.

(21) Appl. No.: 14/840,006

(22) Filed: Aug. 30, 2015

(65) Prior Publication Data

US 2016/0059785 A1    Mar. 3, 2016

Related U.S. Application Data

(63) Continuation-in-part of application No. 13/969,566, filed on Aug. 17, 2013, now abandoned.

(60) Provisional application No. 61/696,209, filed on Sep. 2, 2012, provisional application No. 61/719,525, filed on Oct. 29, 2012, provisional application No. 61/746,100, filed on Dec. 26, 2012, provisional application No. 62/044,288, filed on Aug. 31, 2014, provisional application No. 62/063,050, filed on Oct. 13, 2014, provisional application No. 62/133,350, filed on Mar. 14, 2015.

(51) Int. Cl.
*B60R 1/08* (2006.01)
*B60R 1/04* (2006.01)
*B60R 1/00* (2006.01)
*B60R 11/00* (2006.01)

(52) U.S. Cl.
CPC .............. *B60R 1/081* (2013.01); *B60R 1/007* (2013.01); *B60R 1/04* (2013.01); *B60R 2011/0008* (2013.01)

(58) Field of Classification Search
CPC ........... B60R 1/081; B60R 1/007; B60R 1/04; B60R 2011/0008
USPC .......................................... 359/844; 248/160
See application file for complete search history.

(56) References Cited

U.S. PATENT DOCUMENTS

| | | | | |
|---|---|---|---|---|
| 2005/0063080 A1* | 3/2005 | Xiao | ........................ | B60R 1/082 359/871 |
| 2006/0108485 A1* | 5/2006 | Enderle | .................. | F16M 11/40 248/160 |
| 2008/0217493 A1* | 9/2008 | Bevirt | ................... | F16B 47/006 248/163.1 |
| 2010/0314508 A1* | 12/2010 | Bevirt | .................. | F16M 11/041 248/121 |

(Continued)

*Primary Examiner* — Bumsuk Won
*Assistant Examiner* — Wen Huang
(74) *Attorney, Agent, or Firm* — Global IP Services; Tianhua Gu

(57) ABSTRACT

An interior side mirror with multiple legs supporting device for side blind spot of a car. Which comprises a side mirror; a multiple legs supporting means, which is constructed by a connecting seat for fixing the side mirror with the multiple legs supporting means; a neck section made by half-solid metal wire; legs made by half-solid metal wire, ends of legs are connected with the neck section; adhesive components for fixing the legs on a place of interior surface of a car; the half-solid metal wire means the metal wire is flexible and is able to keep a bended shape after bending. This interior side mirror with a multiple legs supporting device can be used for any vehicle conveniently and get well side blind spot.

7 Claims, 23 Drawing Sheets

(56) References Cited

U.S. PATENT DOCUMENTS

2011/0297566 A1* 12/2011 Gallagher ............ F16M 11/105
                                                          206/320

* cited by examiner

INTERIOR SIDE MIRROR FOR SIDE BLIND SPOT OF A CAR

CROSS REFERENCE TO RELATED PATENT APPLICATION

This application is a continuation application in part of the U.S. application Ser. No. 13/969,566 filed on Aug. 17, 2013. Also this application claims the priorities of U.S. provisional application No. 61/696,209 filed on Sep. 2, 2012, U.S. provisional application No. 61/719,525 filed on Oct. 29, 2012 and U.S. provisional application No. 61/746,100 filed on Dec. 26, 2012, U.S. provisional application No. 62/044,288 filed on Aug. 31, 2014, U.S. provisional application No. 62/063,050 filed on Oct. 13, 2014 and U.S. provisional application No. 62/13350 filed on Mar. 14, 2015, which applications are incorporated herein by reference.

FIELD OF THE INVENTION

The present invention relates to side mirror assemblies, and more particularly to an interior side mirror for side blind spot.

BACKGROUND OF THE INVENTION

Every driver knows the side blind spot. When changing lane the driver must turn head to view the side blind spot to know if vehicles are existed. If the driver forgets to do it, car crash accident may be happen. Returning head to view the side blind spot is very important but brings tire to the driver. Many inventions want to solve this problem, but these inventions are complex, and expensive. Some of them are simple and used with an exterior side mirror, but the image of the blind spot is small, driver cannot see it clearly.

SUMMARY OF THE INVENTION

The purpose of the present invention is to provide an interior side mirror for side blind spot to assist driver viewing the side blind spot without returning head.

An interior side mirror for side blind spot comprises a multiple legs supporting means. The multiple supporting means has a spider structure and its legs are made by half-solid metal wire which is flexible and is able to keep a bended shape after bending. Therefore, the multiple legs supporting means can fix the interior side mirror on any place of the interior surface of the car reliably and let the side mirror being adjusted to a best position for viewing the side blind spot. This interior side mirror with a multiple legs supporting means for side blind spot can be used for any vehicle conveniently and get well results. The multiple legs supporting means has two or three or four or more legs.

An interior side mirror for side blind spot of a car comprising a base fixed on an interior part of the car before a driver; a side mirror; and a flexible bar for connecting the base with the side mirror; the side mirror can be placed a best position for the driver viewing the side blind spot without turning head.

The interior side mirror has a base is an anchor base, which has a plate, a neck is on the plate and a ball is supported by the neck, a plurality of anchor legs are extended from a back of the plate, the plurality of anchor legs are inserted into an side AC vent window to fix the anchor base therein.

The base of the interior side mirror for side blind spot can be a sand bag base, which is sit on a dash board beside the driver by weight, the side mirror is fixed on a flexible metal conduit which is fixed on the sand bag.

The base of the interior side mirror for side blind spot can be a cardboard base having adhesive tape, which is stuck on a dash board beside the driver, the side mirror is fixed on a flexible metal conduit which is fixed on the cardboard base.

The base of the interior side mirror for side blind spot can be a silicone sticky pad base having adhesive tape, which is stuck on a dash board beside the driver, the side mirror is fixed on a ball-socket joint flexible bar which is fixed on the silicone sticky pad.

The present invention of interior side mirror for side blind spot is very important for drivers. It can solve the problem of the common side mirror cannot view the side blind spot, it can release driver's fatigue gotten from returning head and help improve driving safety.

DETAIL DESCRIPTION OF THE INVENTION

Embodiment 1

Figure 1:
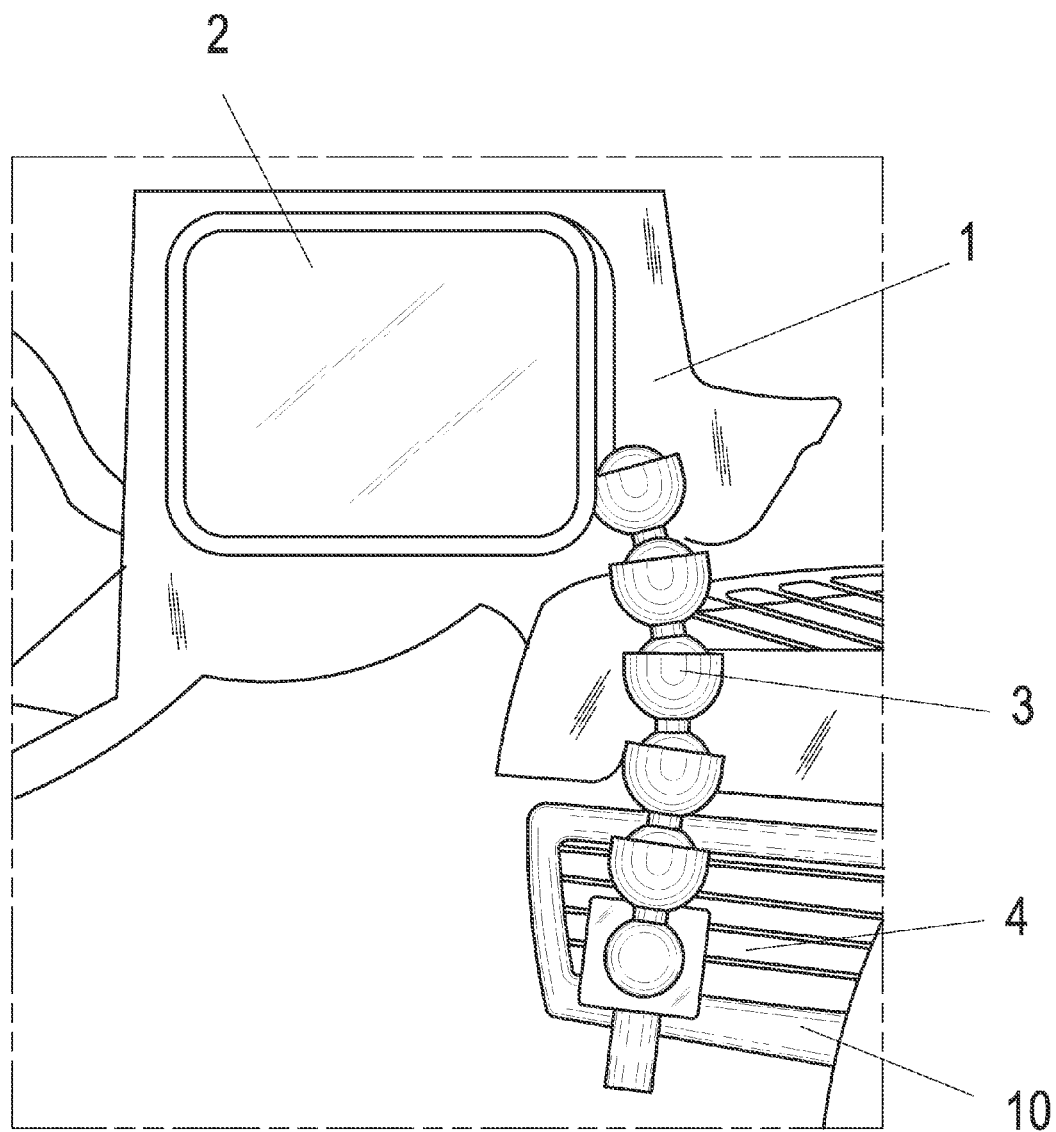
FIG. 1 shows the interior side mirror for side blind spot, which has anchor base fixed on a side AC vent window.
Figure 2:
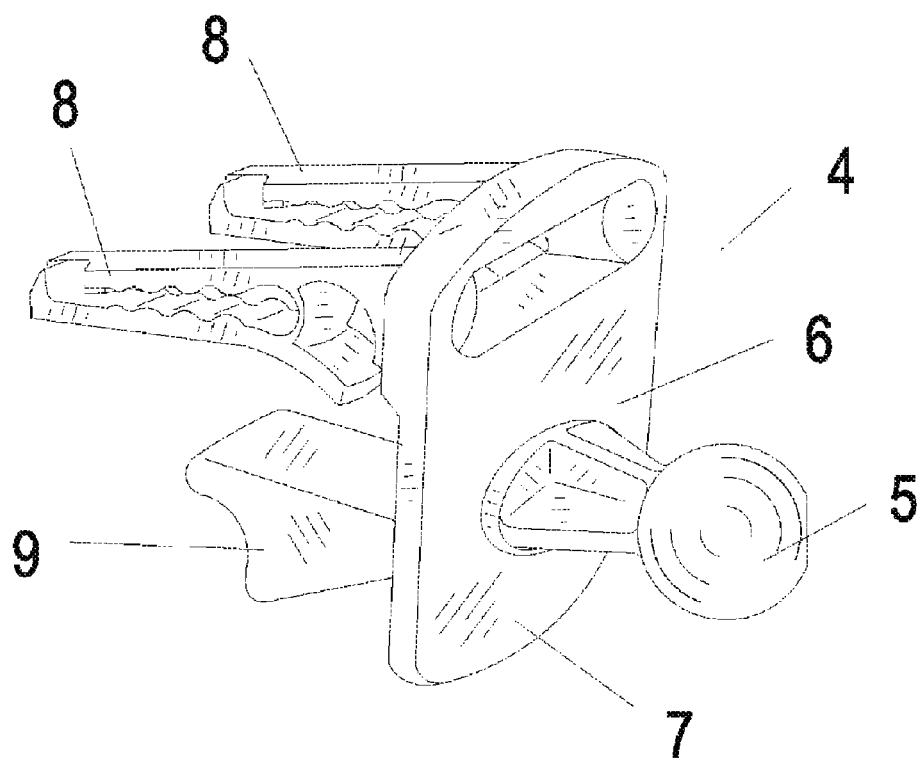
FIG. 2 shows the anchor base of the interior side mirror for side blind spot.
Figure 3:
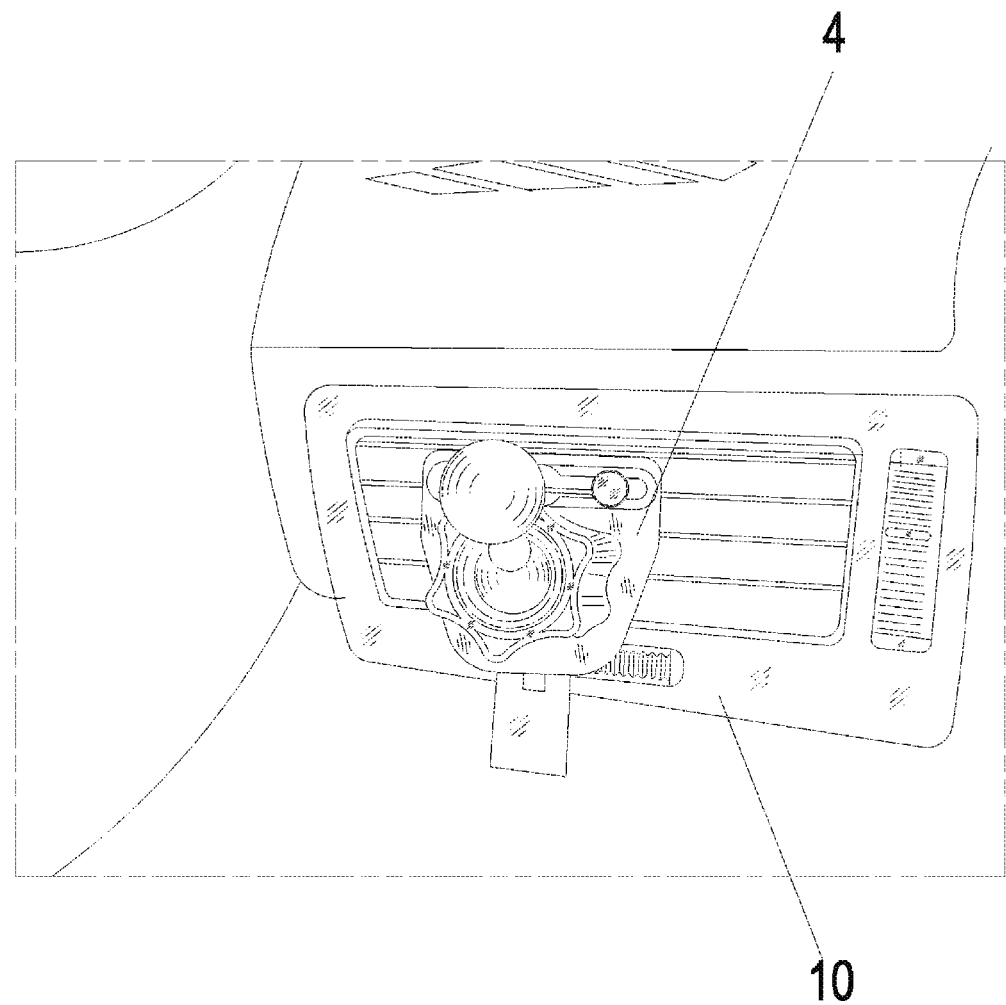
FIG. 3 shows the anchor base is fixed on the side AC vent window by its three anchor legs.
Figure 4:
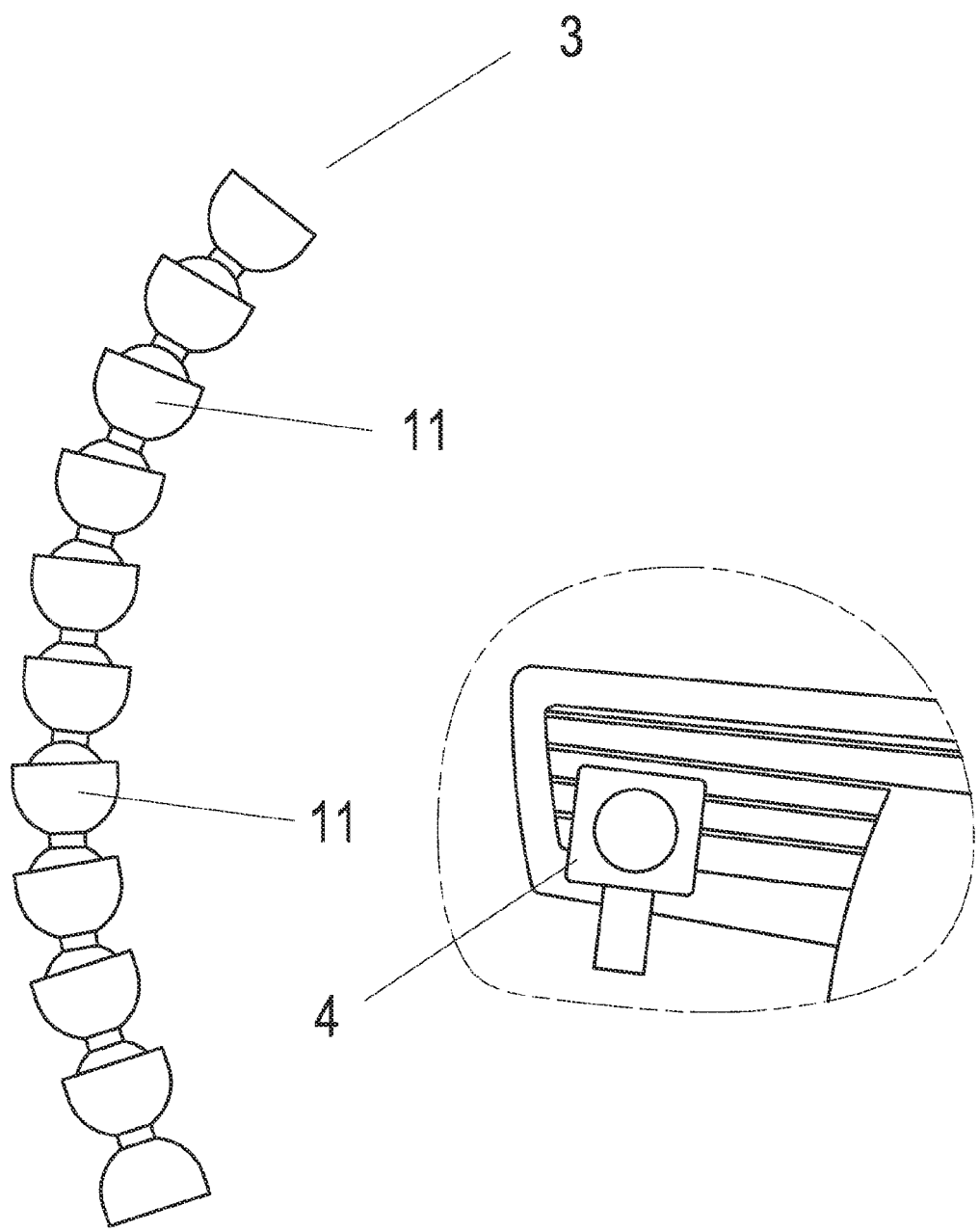
FIG. 4 shows the ball-socket joint flexible bar of the interior side mirror for side blind spot.
Figure 5:
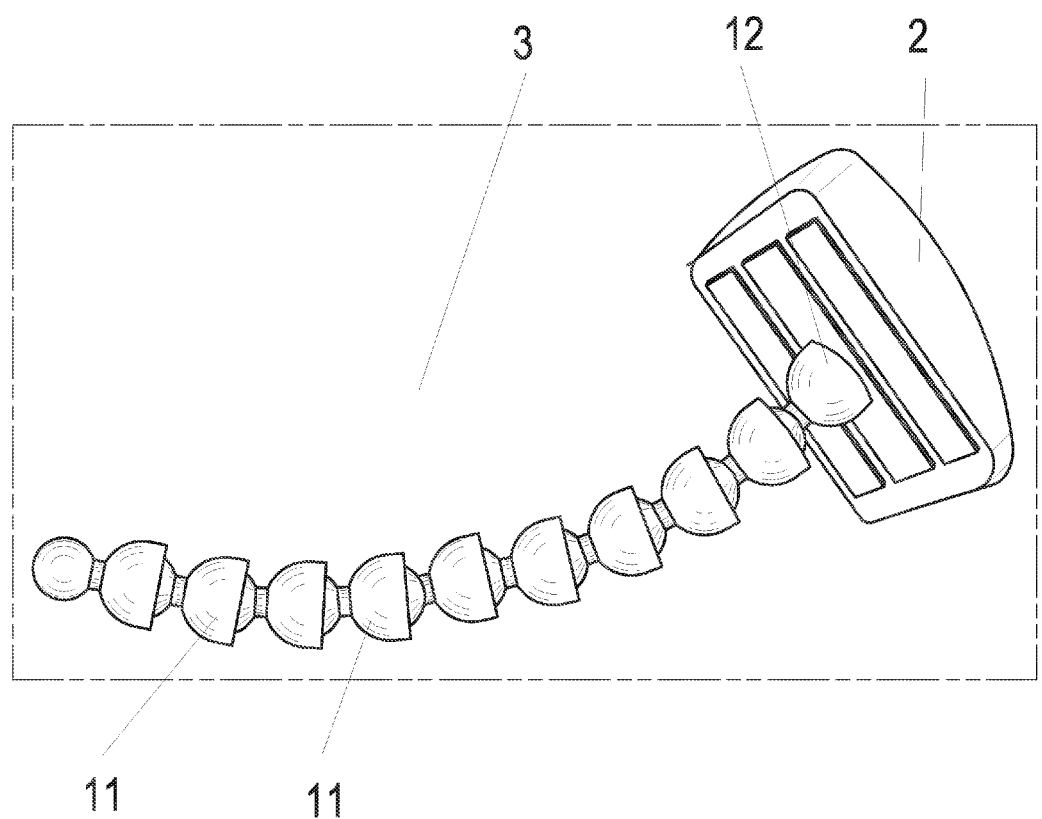
FIG. 5 shows the side mirror being connected with the ball-socket joint flexible bar.
Figure 6:
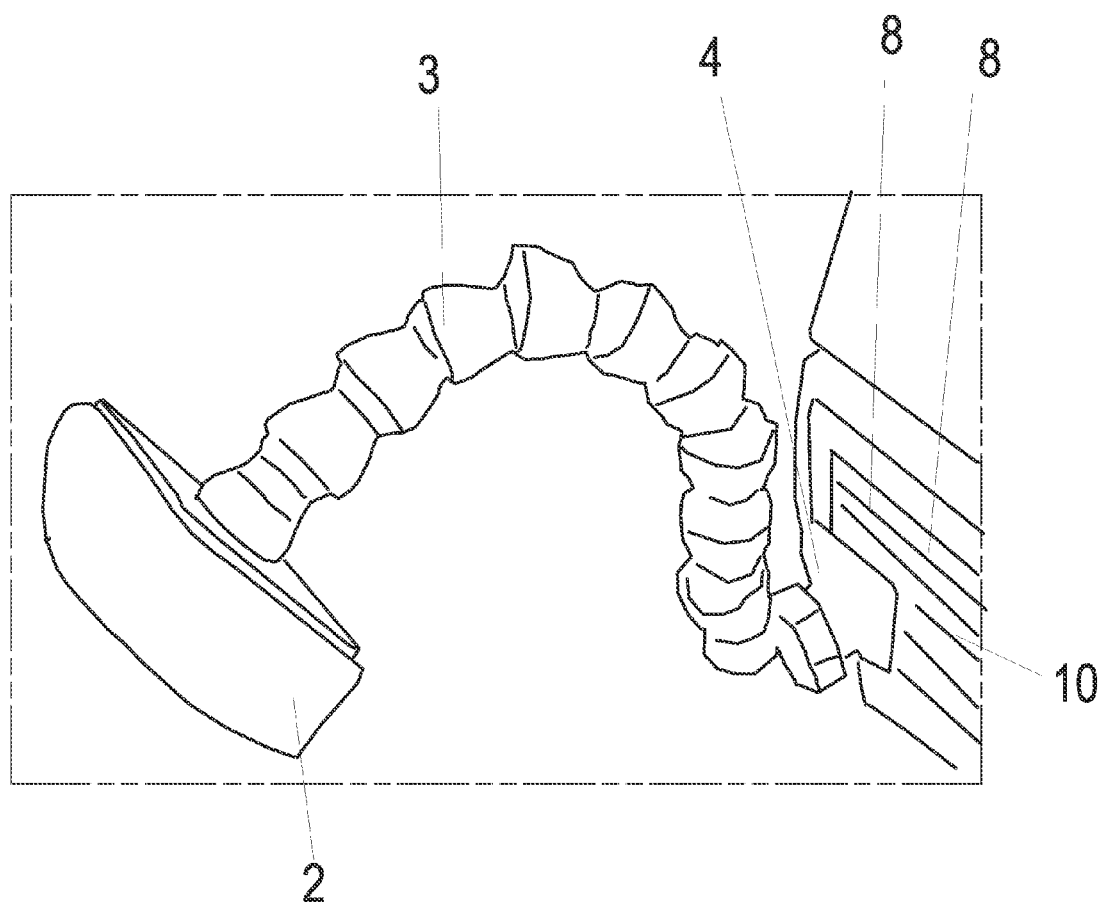
FIG. 6 shows the interior side mirror for side blind spot is fixed on the side AC vent window by the anchor base.
Figure 7:
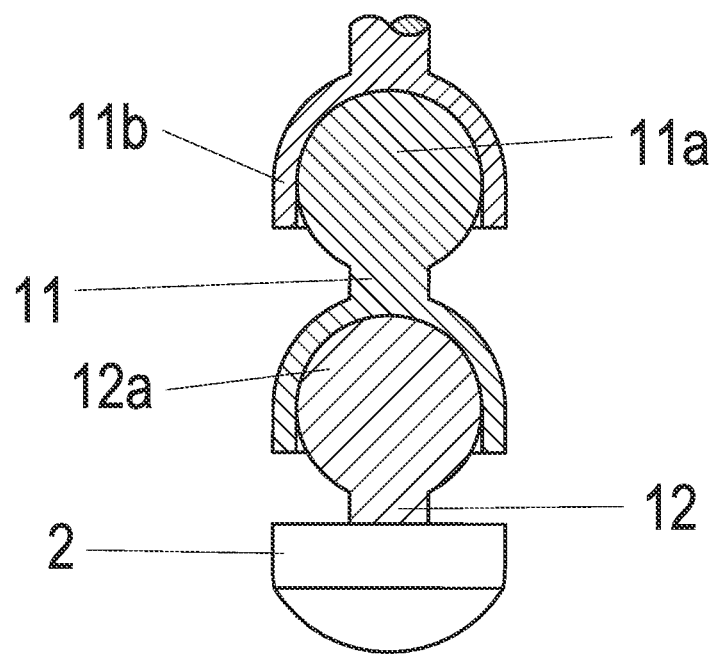
FIG. 7 shows the side mirror connected with the ball-socket joint flexible bar.

Please refer to FIGS. 1, 2, 3, 4, 5, 6 and 7. An interior side mirror for side blind spot 1 comprises an anchor base 4, a ball-socket joint flexible bar 3 and a mirror 2.

The anchor base 4 has a plate 7, a neck 6 is on the plate 4 and a connecting ball 5 is on the neck, a plurality of anchor legs (8 and 9) are extended from a back of the plate 7, the plurality of legs (8 and 9) are inserted into an side AC vent window 10 to fix the anchor base 4 therein.

The flexible bar 3 is a ball-socket joint flexible bar, which is assembled by a plurality of ball-socket joints 11, each ball-socket 11 has a ball 11a and a recess 11b, the plurality of ball-socket joints 11 are connected together by the balls 11a inserting into the recesses 11b respectively. The connecting ball 5 of the anchor base 4 can be inserted into the recess 11b of the ball-socket joint flexible bar, then the bar and base are connected together.

The back of the mirror 2 is fixed a ball-socket 12 with a ball 12a, which is inserted into the recess 11b of the ball-socket joint flexible bar 3 to connect the interior side mirror 2 therein.

The mirror 2 can be adjusted at a best position for viewing the blind spot by the driver.

Embodiment 2

Figure 8:
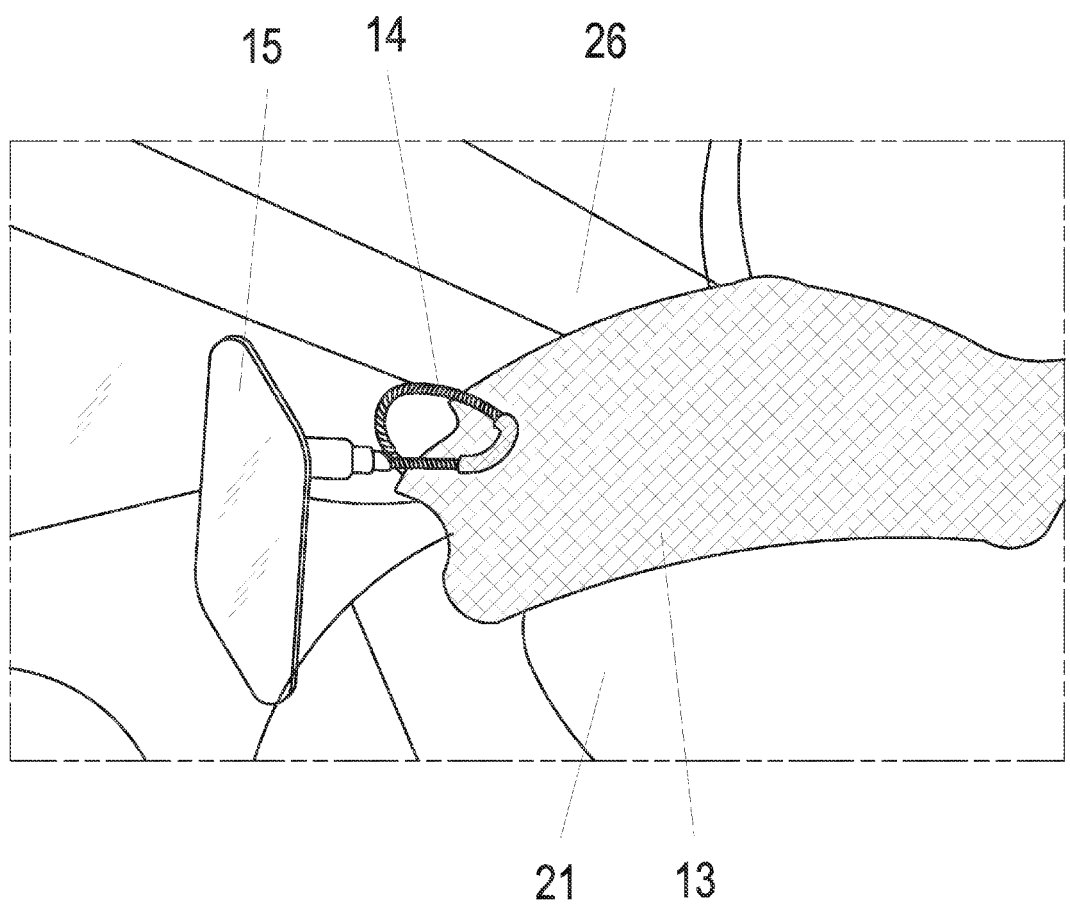
FIG. 8 shows the interior side mirror for side blind spot, which has a sand bag base sit on a dash board.

Please refer to the FIG. 8. An interior side mirror for side blind spot 26 comprises a sand bag base 13, a flexible metal conduit bar 14 and a mirror 15.

The sand bag base 13 is made by cloth wrapping up sand. The flexible metal conduit bar is fixed with the sand bag base 13 at first end and fixed with the mirror 14 at second end. The sand bag base 13 is set on the dash board 21.

The mirror 15 can be adjusted at a best position for viewing the blind spot by the driver.

Embodiment 3

Figure 9:
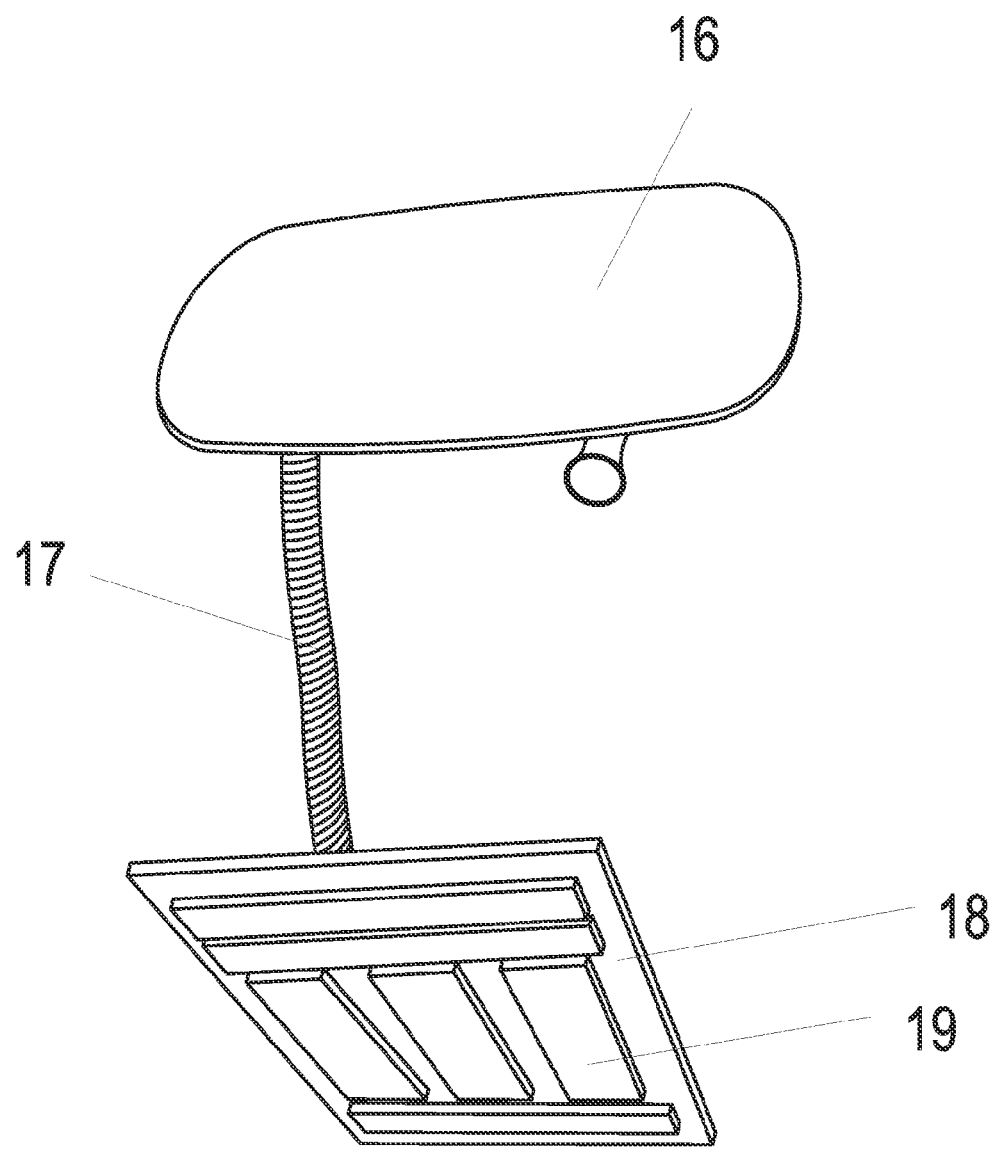
FIG. 9 shows the interior side mirror for side blind spot, which has a cardboard base having adhesive tape.
Figure 10:
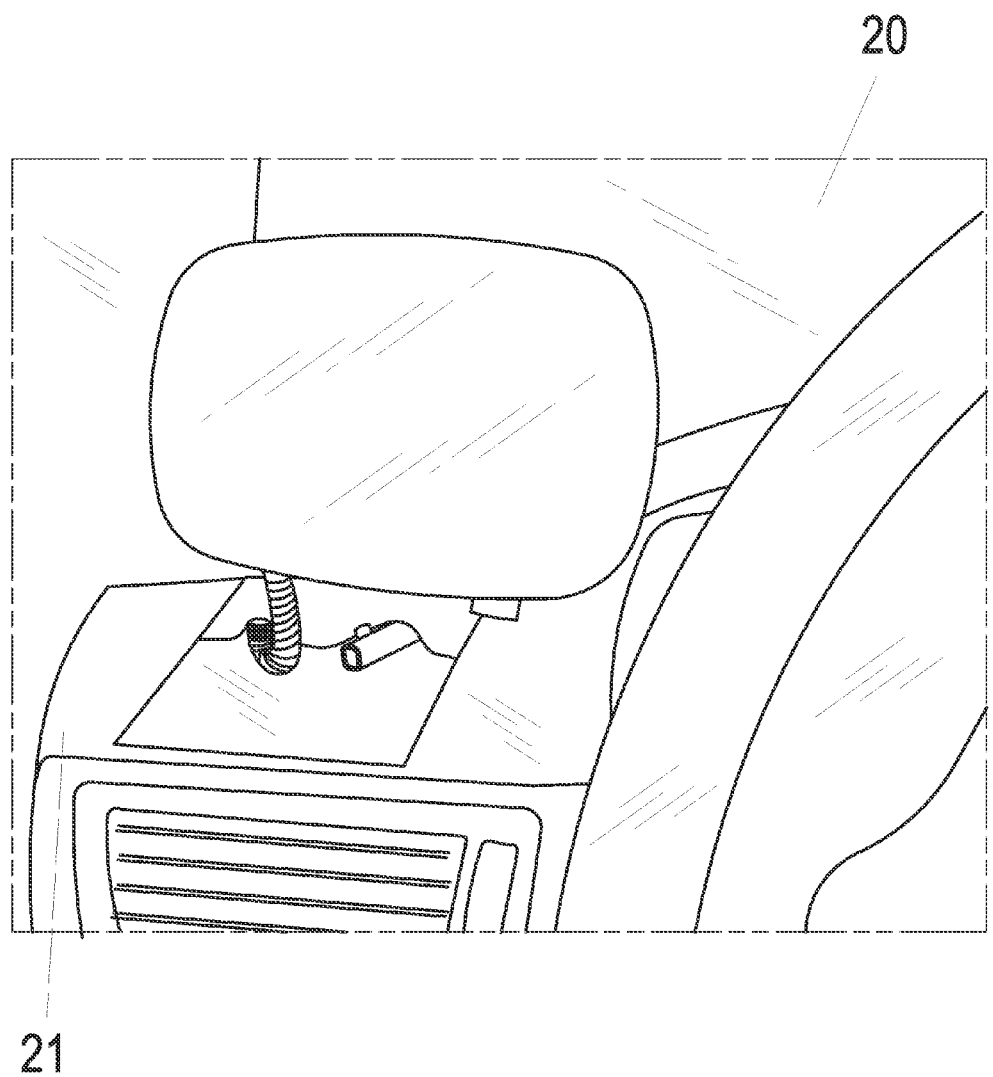
FIG. 10 shows the interior side mirror for side blind spot with a cardboard base, which is stuck on the dash board of the car.
Figure 11:
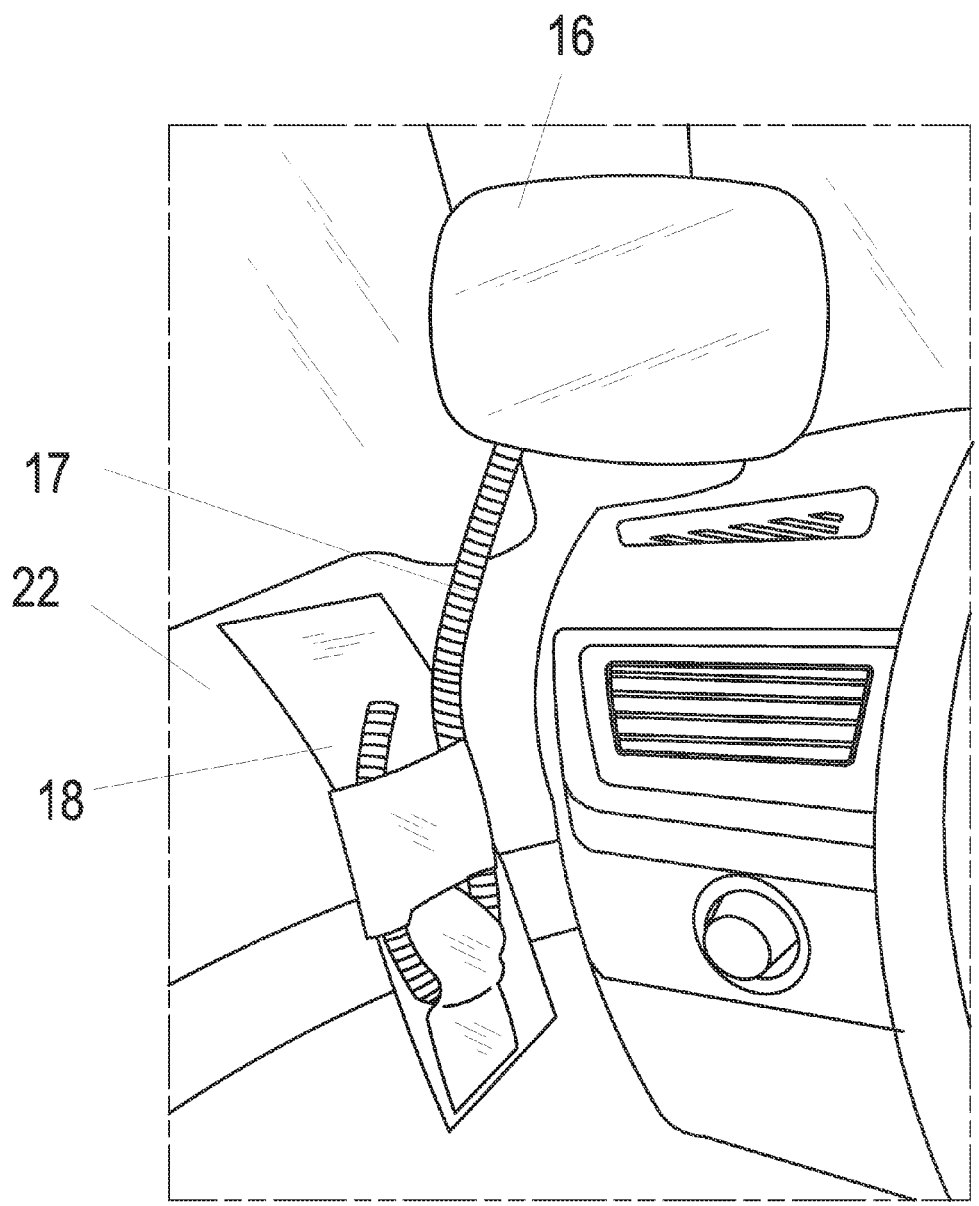
FIG. 11 shows the interior side mirror for side blind spot with a flexible cardboard base, which is stuck on the side door of the car.

Please refer to the FIGS. 9, 10 and 11. An interior side mirror for side blind spot 20 comprises a cardboard base 18, a flexible metal conduit bar 17 and a mirror 16. The cardboard base 18 has adhesive tapes 19 on its back face.

The mirror 16 is fixed on first end of the flexible metal conduit bar 17, second end of the flexible metal conduit bar 17 is fixed on the cardboard base 18, which is stuck on the dash board 21 or the side door 22 by the adhesive tapes 19.

The mirror 16 can be adjusted at a best position for viewing the blind spot by the driver.

Figure 12:
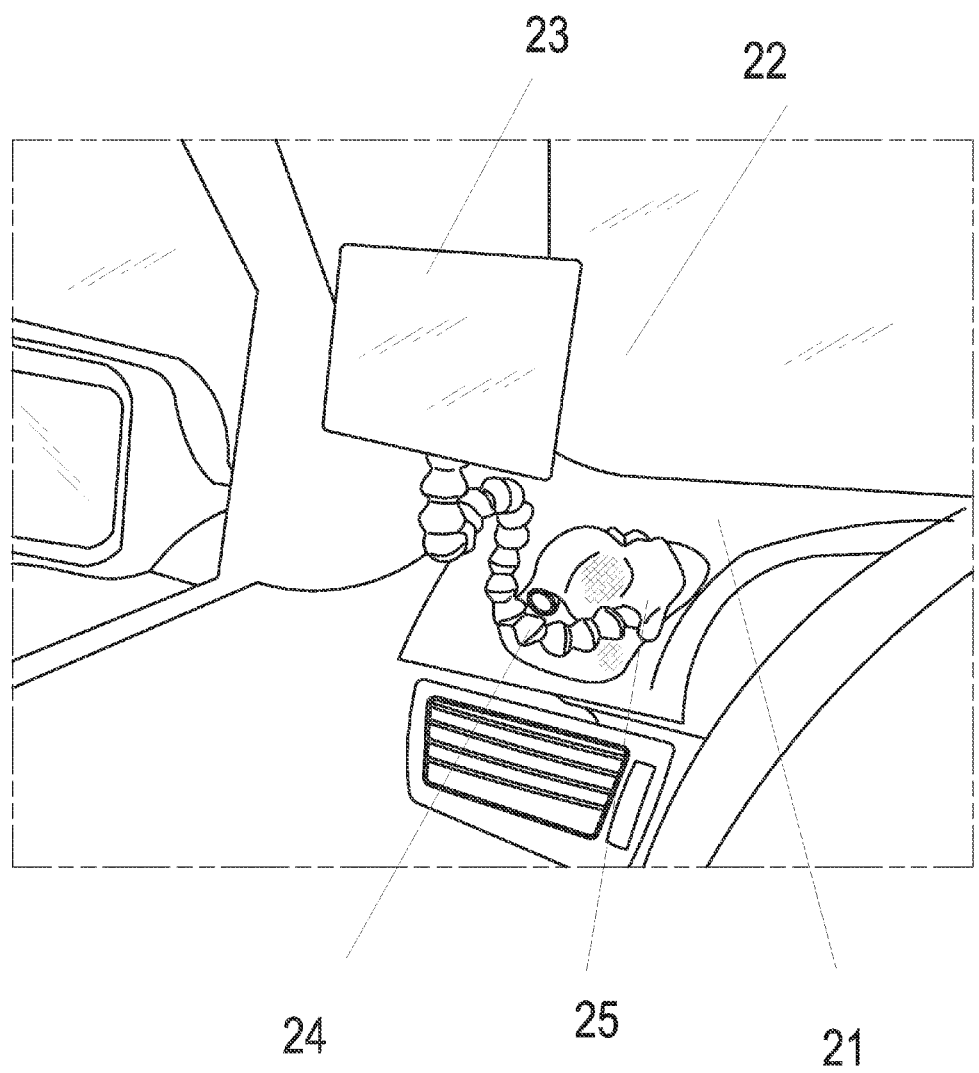
FIG. 12 shows the interior side mirror for side blind spot with a silicone sticky pad base, which is stuck on the dash board of the car.
Figure 13:
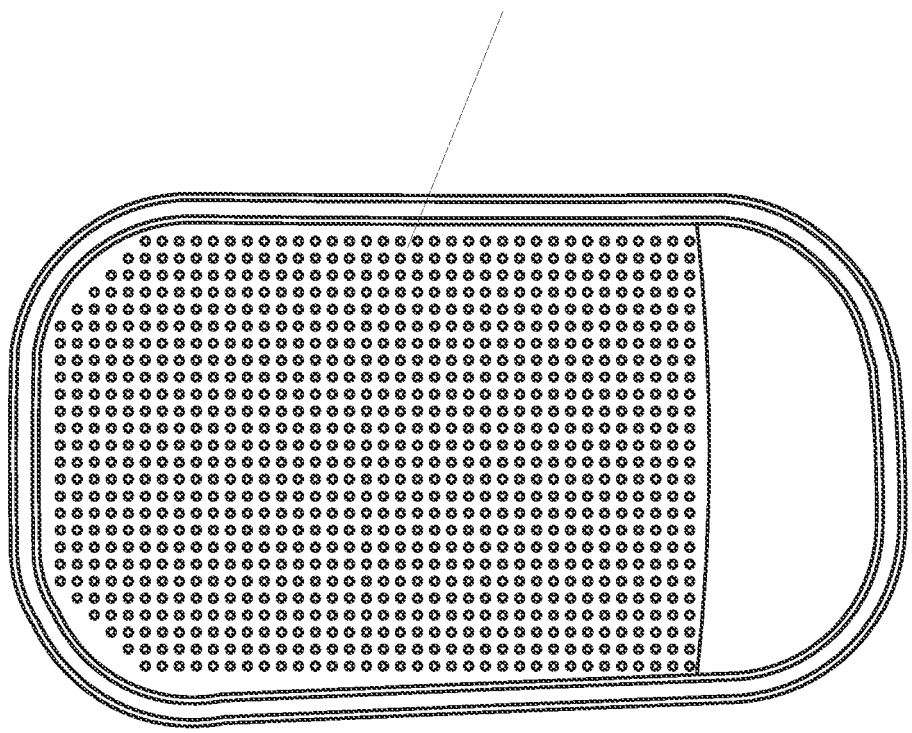
FIG. 13 shows the silicone sticky pad.

Please refer to the FIGS. 12 and 13. An interior side mirror for side blind spot 22 comprises a silicone sticky pad base 25, a ball-socket joint flexible bar 24 and a mirror 23. The silicone sticky pad base 25 has a silicone sticky pad 26, which is very sticky and secure without getting loosened up easily at all once applied. Another good property is that when peeled off, it doesn't leave any residuals on the surface that it was stuck onto. This silicone is sold in market.

The mirror 23 is fixed on first end of the ball-socket joint flexible bar 24, second end of ball-socket joint flexible bar 24 is fixed on the silicone sticky pad base 25, which is stuck on the dash board 21.

The mirror 23 can be adjusted at a best position for viewing the blind spot by the driver.

Embodiment 4

Figure 14:
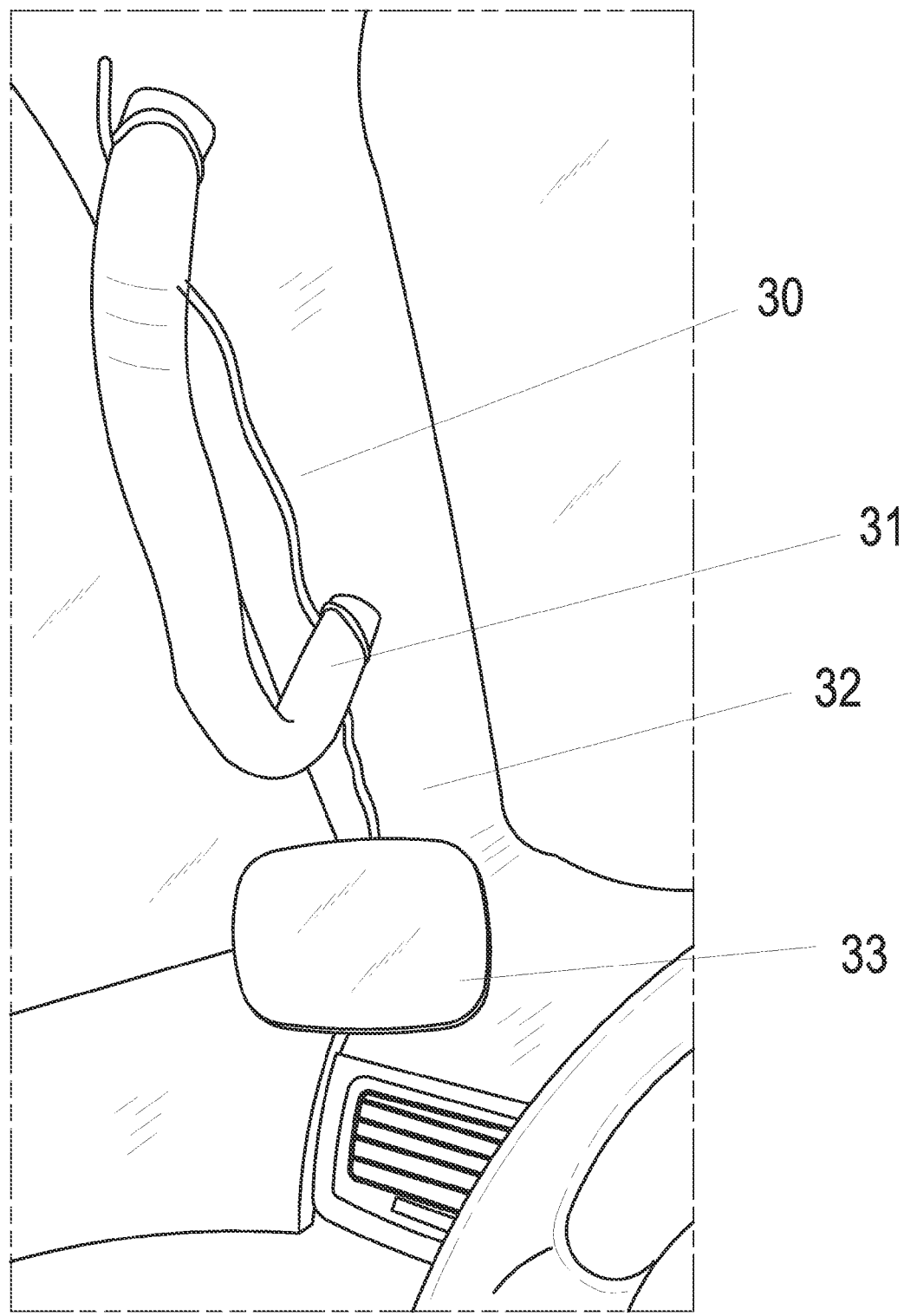
FIG. 14 shows the interior side mirror for side blind spot with a handle base. The handle base can be the inherent handle of a car.
Figure 15:
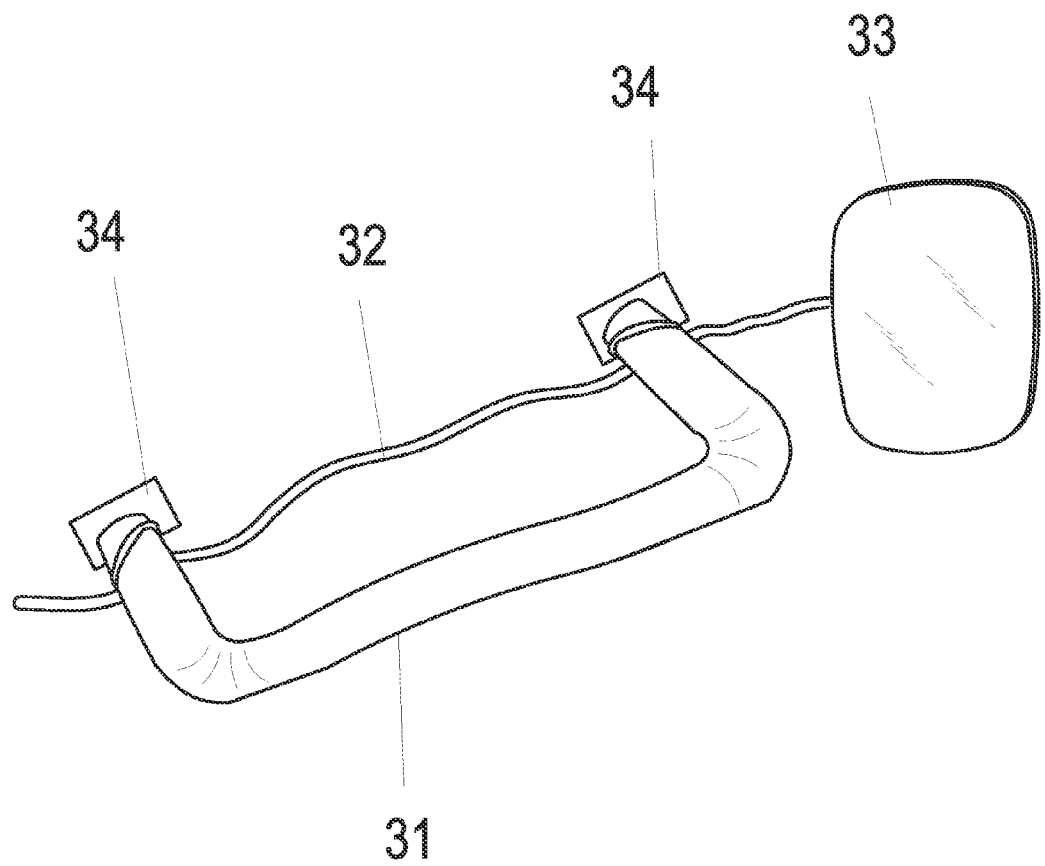
FIG. 15 shows the handle base can be a handle, then be fixed on the wall of the car.
Figure 16:
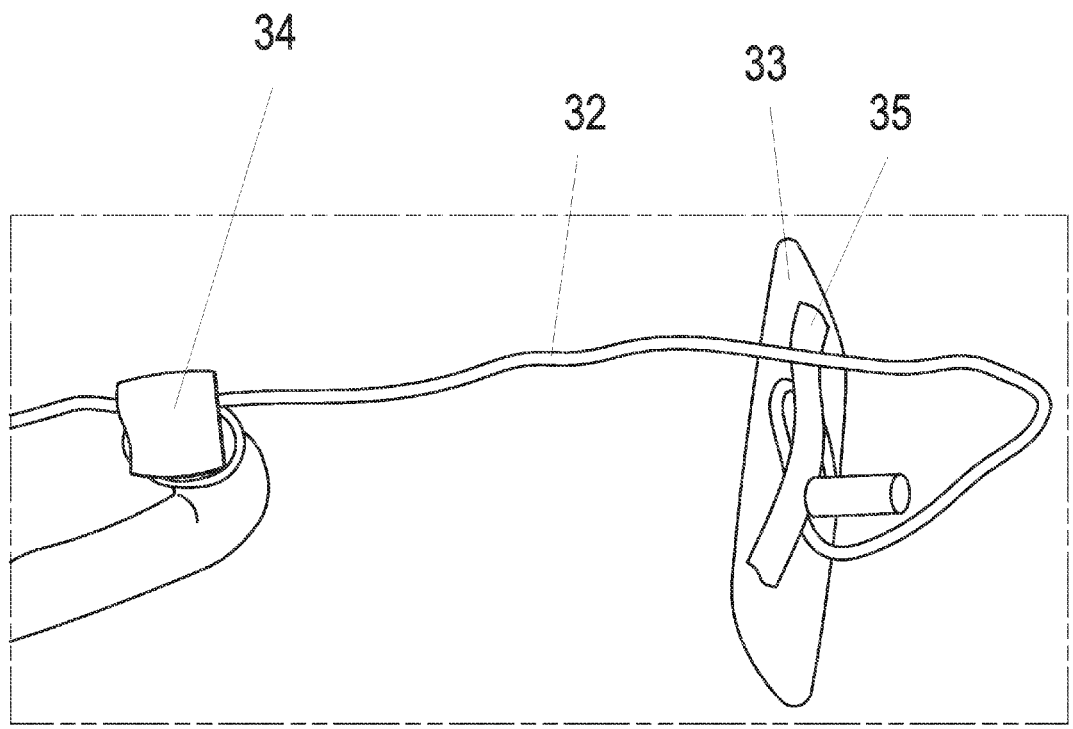
FIG. 16 shows the connection between the flexible bar and the side mirror.

Please refer to the FIGS. 14, 15 and 16. An interior side mirror for side blind spot 30 comprises a handle base 31, a flexible metal wire bar 32 and a mirror 33.

In some minivans and bigger trucks there are a handle beside the driving site. This inherent handle can be used as a handle base 31 for the interior side mirror. A metal wire is fixed on the back of the mirror 33. The metal wire is twined on the handle. Then mirror 33 can be adjusted at a best position for viewing the blind spot by the driver.

The flexible metal wire bar 32 can be a metal wire, or a ball-socket joint flexible bar or a metal conduit bar.

The handle base also can be separated from the wall of car. Please refer to FIG. 15. A handle 31 has two ends, which have stick pad 34 on them. The handle 31 can be stuck on the wall of the car by the stick pad.

Please refer to FIG. 16, the metal wire is stuck on the back of the mirror 35. Also can use mechanical method for connecting the flexible metal bar 32 with the mirror.

Embodiment 5

Please refer to the FIGS. 17 to 27. An interior side mirror for side blind spot comprises a multiple legs supporting means. The multiple legs are three legs to compose a tripod. The advantages are that the tripod supporting means has a tripod structure and its three legs are made by half-solid metal wire which is flexible and keep-able in a bended shape after bending.

Therefore, the tripod supporting means can fix the interior side mirror on any place of the interior surface of the car reliably and let the side mirror being adjusted to a best position for viewing the side blind spot. This interior side mirror with a tripod supporting means for side blind spot can be used for any vehicle conveniently and get well results.

Figure 17:
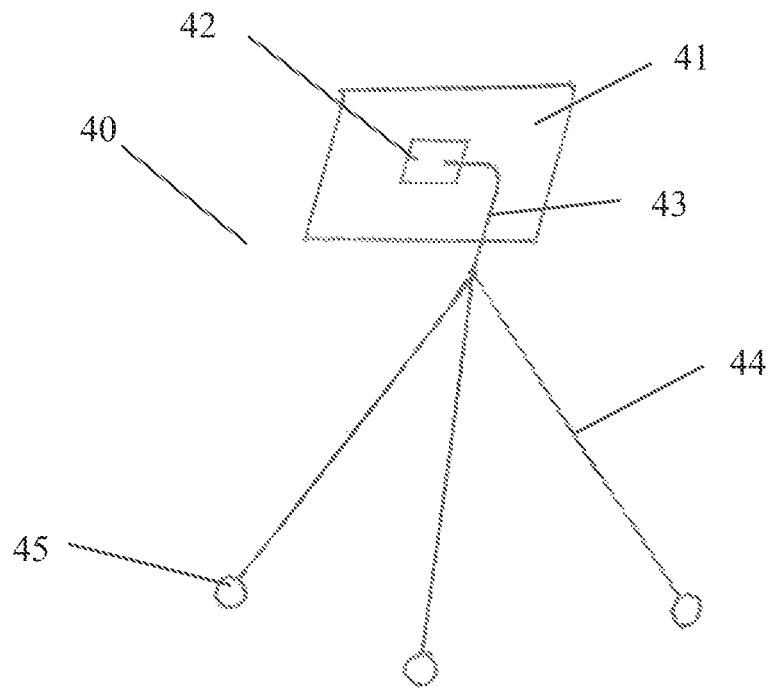
FIG. 17 shows the interior side mirror for side blind spot, which has a tripod supporting structure.

Refer to FIG. 17, an interior side mirror for side blind spot with three legs supporting means 40 comprises a side mirror 41.

A connecting seat 42 is fixed on the back face of the side mirror 41 by glue or mechanical method.

A neck section 43 is connected with the supporting means 40, the neck section 43 is made by half-solid metal wire, which means the metal wire is flexible and able to keep a bended shape after bending (this definition is used for all description thereafter).

Three legs 44 are made by half-solid metal wire, ends of legs 44 are joined together and connected with the end of the neck 43, the three legs 44 are separated to constitute a tripod. The neck and legs are made by metal wire, such as copper wire, iron wire, steel wire or metal wire with plastic coat.

Each end of the legs has an adhesive components 45 for fixing the three legs on a place of interior surface of a car. The adhesive component is a bended end part of the leg for the tripod being adhered on the place interior surface of the car (see FIG. 18). The adhesive component 45 is a gummed paper or gummed plastic piece 46 for adhering the three legs on the place of interior surface of the car. Also, refer to FIG. 21, the adhesive component is a sucking disc 47 for sucking the three legs on the place of interior surface of the car. Also, refer to FIG. 20, the adhesive component is a cardboard 48, gummed papers or gummed plastic pieces 46 adhere the three legs 44 on the cardboard 48, then adhere the cardboard 48 on the place of interior surface of the car 49.

Figure 18:
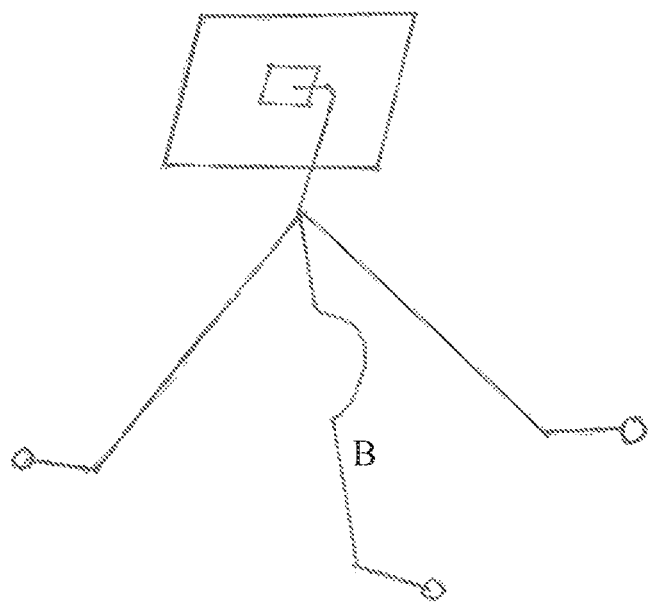
FIG. 18 shows one leg of the tripod supporting means is bended to shorten the distance between two ends of the leg.
Figure 19:
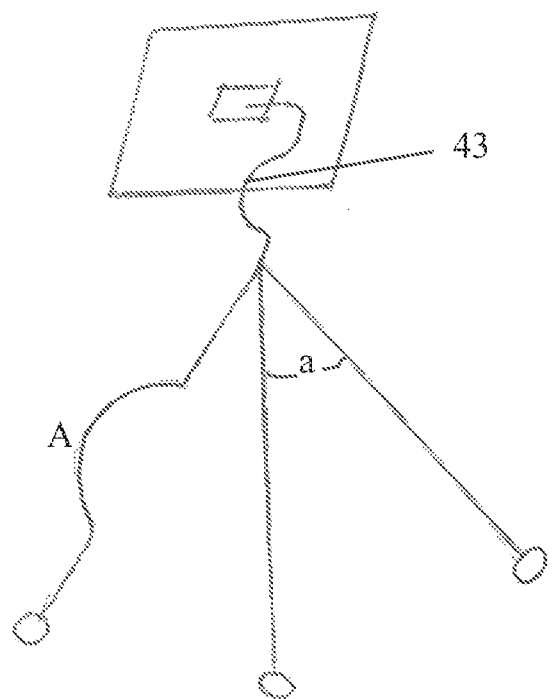
FIG. 19 shows the neck section is bended and twisted.
Figure 20:
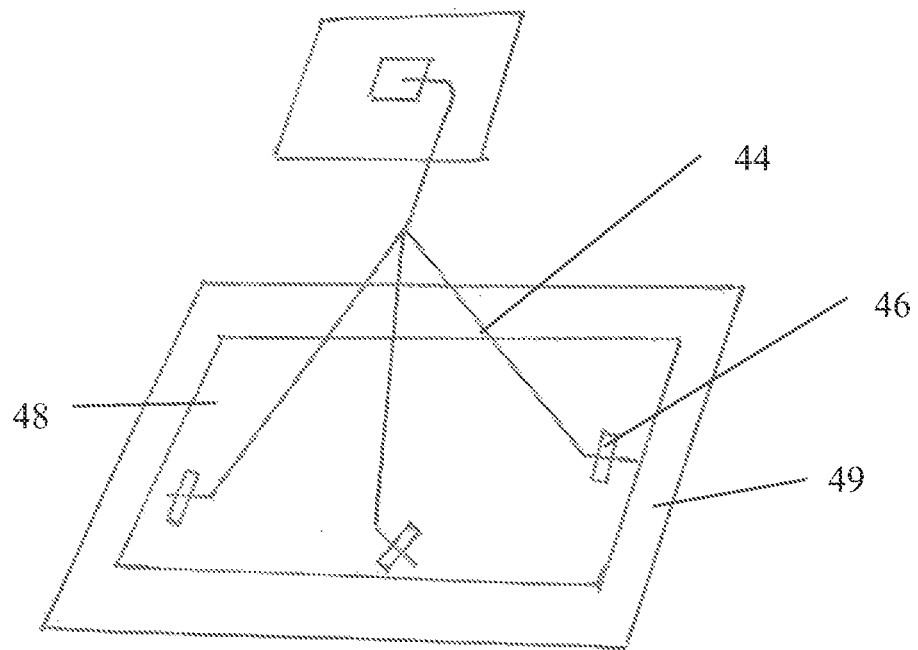
FIG. 20 shows the three legs is fixed on the cardboard, then the cardboard is fixed on the place of interior surface of the car by gummed papers or gummed plastic pieces.

Refer to FIGS. 18 and 19, an intersection angle a between two legs is fix-able from 0 to 180 degrees making the tripod supporting means being fix-able on any place of interior surface of different car. Each leg (such as leg A, leg B) is band-able to shorten a distance between two ends of the leg for the tripod supporting means being fixed on any place of interior surface of different car.

Refer to FIG. 19, the neck section 43 is bend-able or twist-able for adjusting the side mirror to a best position for viewing the side blind spot.

Figure 22:
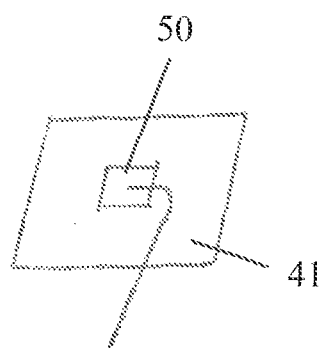
FIG. 22 shows the connecting seat is a metal piece.
Figure 23:
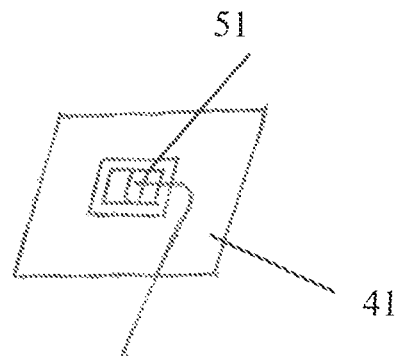
FIG. 23 shows the connecting seat is a frame made by metal wire.
Figure 21:
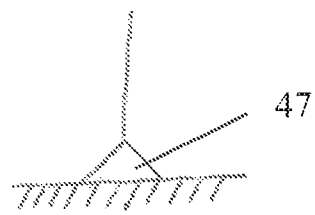
FIG. 21 shows the leg has a sucking disc.

Refer to FIGS. 22 and 23, the connecting seat is a frame 51 made by metal wire or a metal piece 50.

Figures 28, 29:
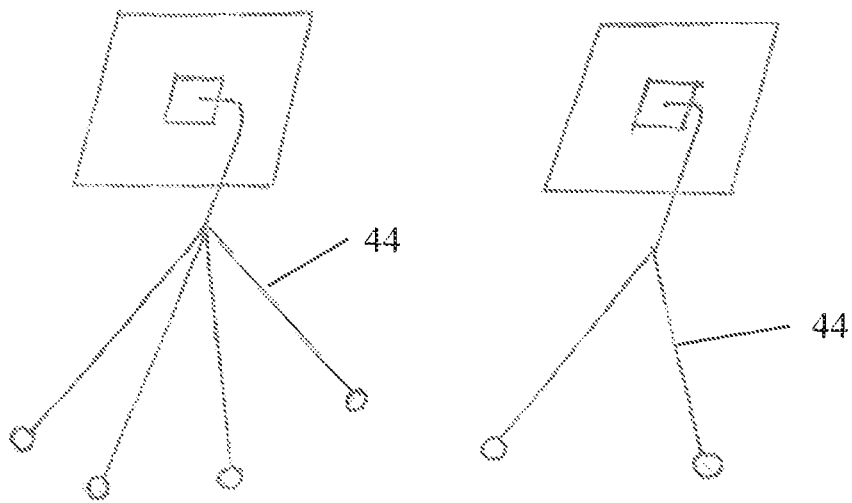
FIG. 28 shows the multiple legs supporting means has four legs.
FIG. 29 shows the multiple legs supporting means has two legs.
Figure 24:
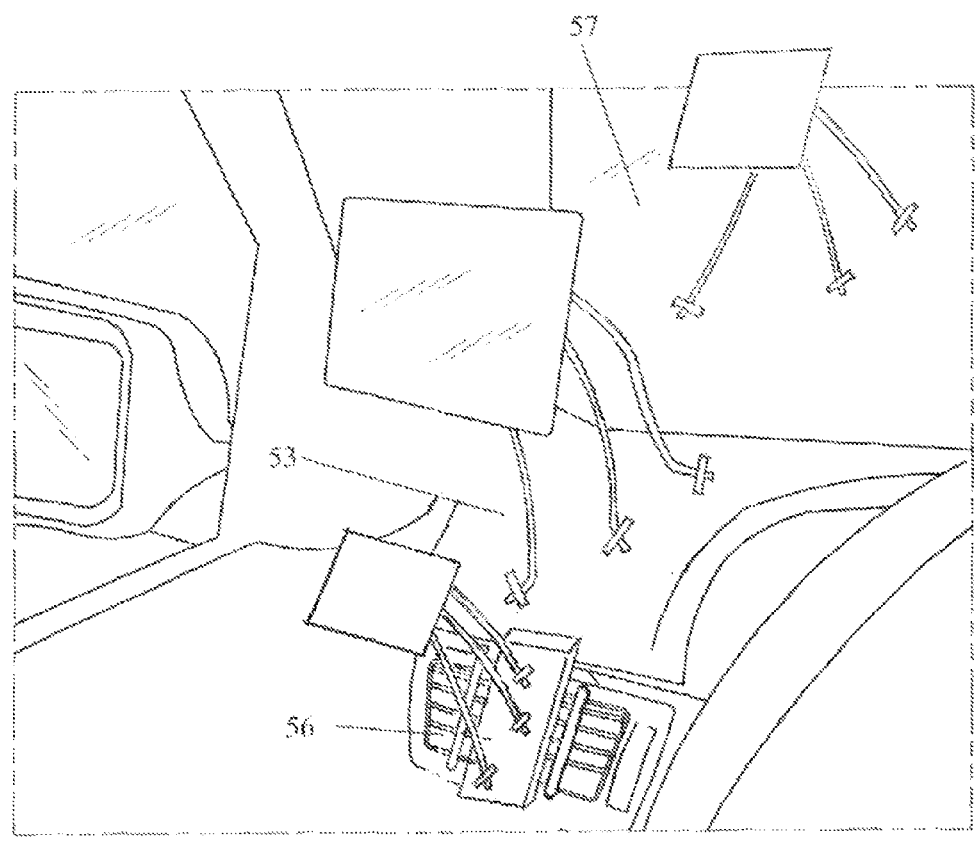
FIG. 24 shows the interior side mirror with tripod supporting means is fixed on the dash board, or front window or air-vent mount of the car.
Figure 25:
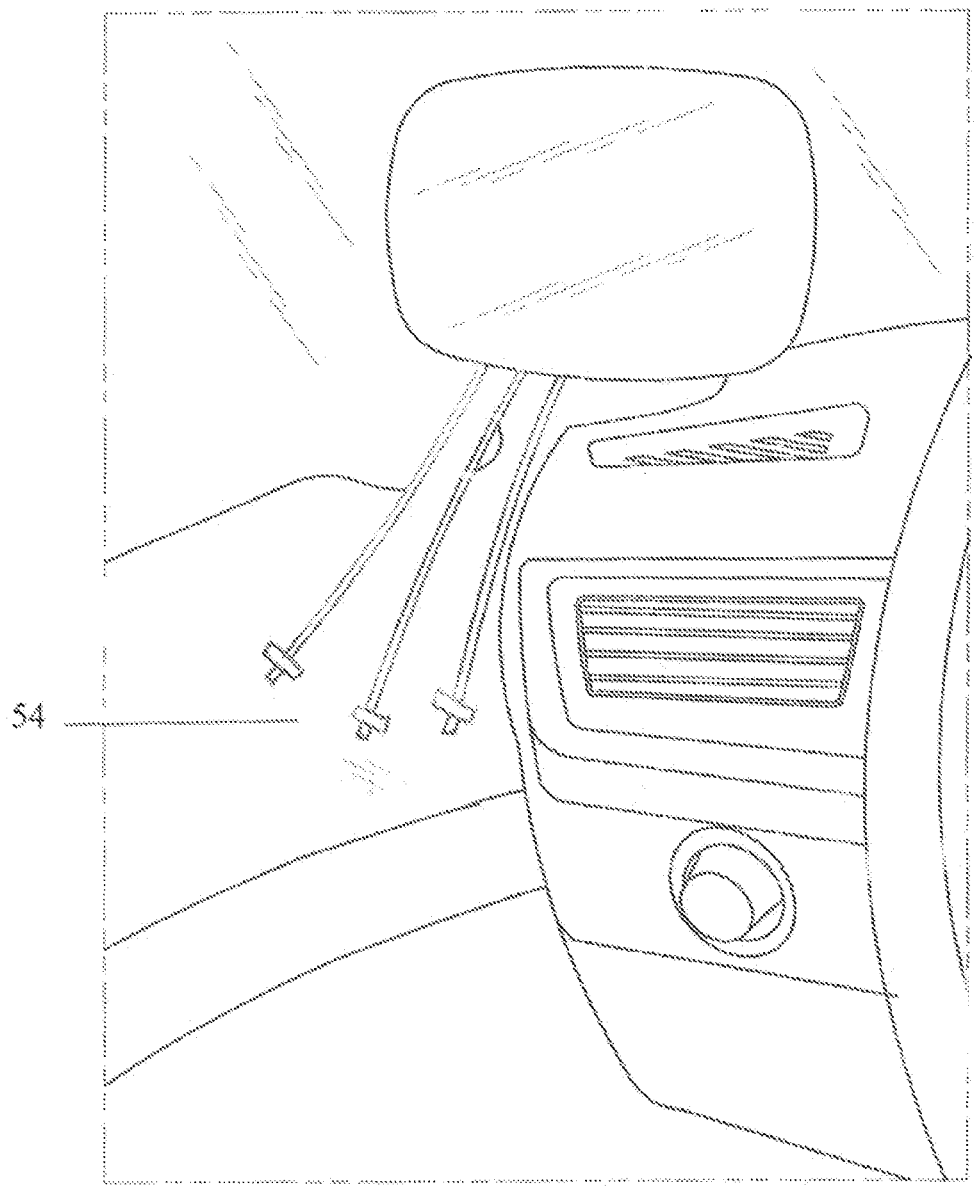
FIG. 25 shows the interior side mirror with tripod supporting means is fixed on the door of the car.
Figure 26:
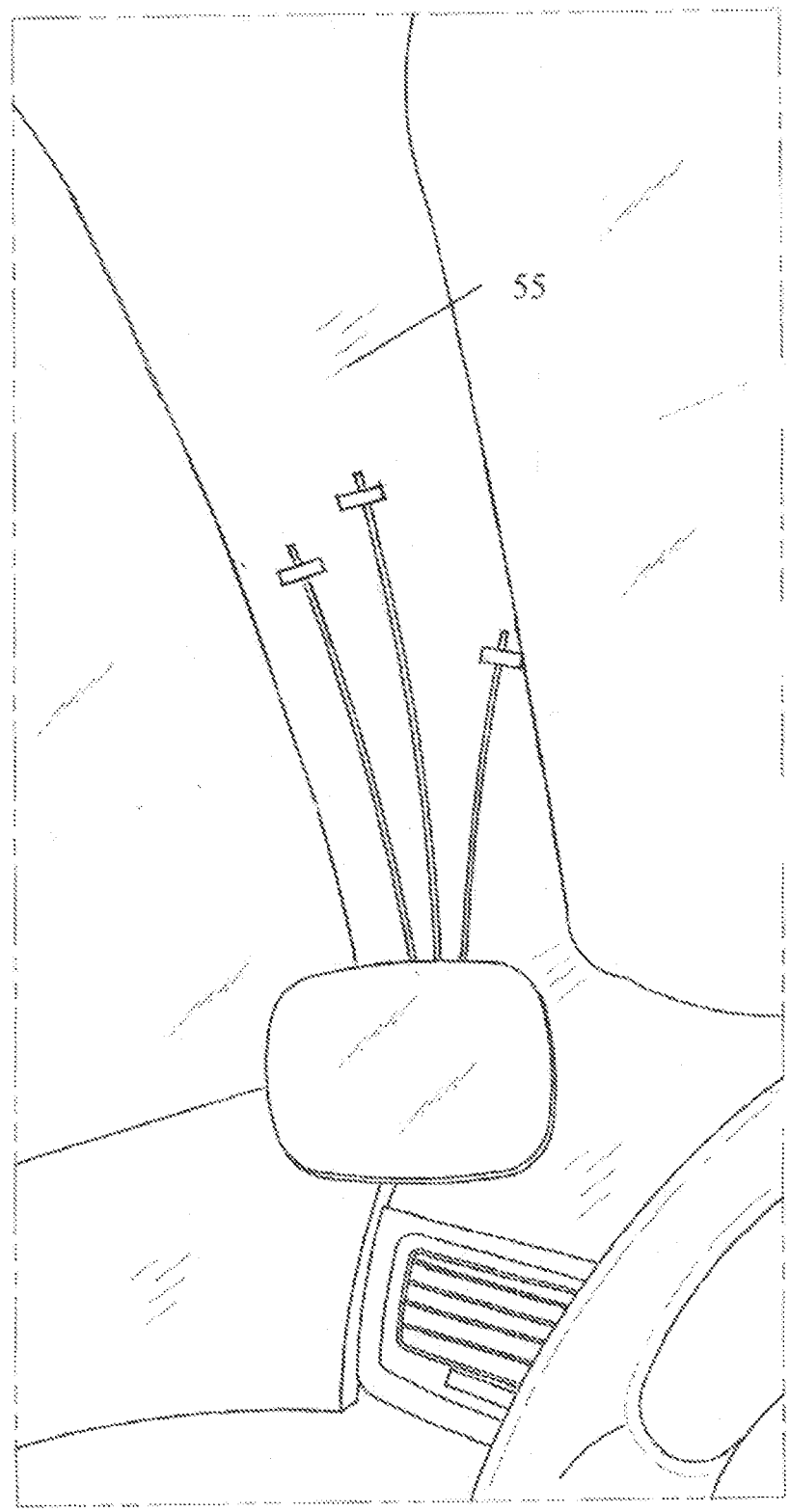
FIG. 26 shows the interior side mirror with tripod supporting means is fixed on the A pillar of the car.
Figure 27:
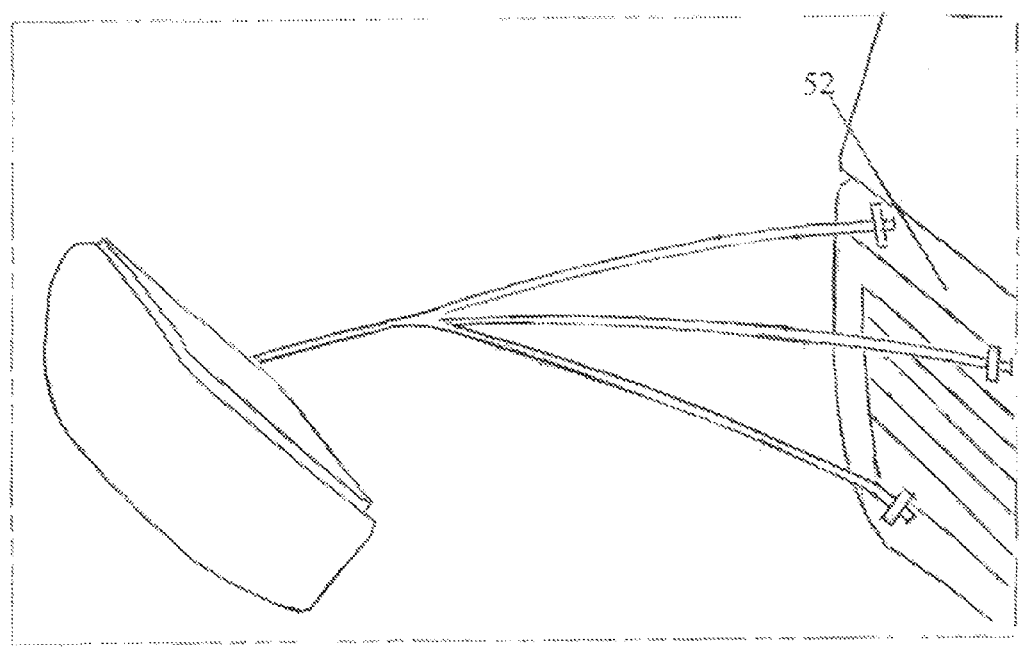
FIG. 27 shows the interior side mirror with tripod supporting means is fixed on the AC vent window of the car.

Refer to FIGS. 28 and 29 the multiple legs supporting means has two or four legs.

Refer to FIGS. 24, 25, 26 and 27, the tripod supporting means is fixed on an AC vent window 52 or a dash board 53 or a door 54 or a front window 57, or an air vent mount 56 or an A pillar 55 of the car beside a driver.

What is claimed is:

1. An interior side mirror for side blind spot of a car comprising:
    a side mirror;
    a multiple legs supporting means, which is constructed by:
        a connecting seat for fixing the side mirror with the multiple legs supporting means,
        a neck section made by half-solid metal wire connected with the connecting seat, the neck section is bend-able or twist-able for adjusting the side mirror to a best position for viewing the side blind spot,
        a multiple of legs made by half-solid metal wire, ends of legs are joined together and connected with the neck section, an intersection angle between two legs is fix-able from 0 to 180 degrees for the multiple legs, each leg is bendable to shorten a distance between two ends of the leg, thereby the multiple legs supporting means is able to be fixed on any place of interior surface of different car,
        said half-solid metal wire means the metal wire is flexible and is able to keep a bended shape after bending;
    adhesive components for fixing multiple legs on a place of interior surface of a car, the adhesive component is a bended end part of the leg, which is adhered on the place interior surface of the car by a gummed paper or gummed plastic piece.

2. The interior side mirror of claim 1, wherein the adhesive components further comprise a cardboard, the gummed papers or gummed plastic pieces adhering the multiple legs on the cardboard, then the gummed papers or gummed plastic pieces adhering the cardboard on the interior surface of the car.

3. The interior side mirror of claim 1, wherein the adhesive components comprise a sucking disc for each one of the multiple of legs for sucking the multiple of legs on the interior surface of the car.

4. The interior side mirror of claim 1, wherein the half-solid metal wires of the multiple of legs and the neck section have plastic coat.

5. The interior side mirror of claim 1, wherein the connecting seat is a frame made by a metal wire or a metal piece.

6. The interior side mirror of claim 1, wherein the multiple of legs supporting means has three or four legs.

7. The interior side mirror of claim 1, wherein the multiple of legs supporting means is fixed on an AC vent window, a dash board, a door, a front window, an A pillar or an air-vent mount of the car.

* * * * *